June 28, 1966 D. N. BUELL 3,258,581

CHARACTER RECOGNITION SYSTEM

Filed Dec. 8, 1961 5 Sheets-Sheet 1

INVENTOR.
David N. Buell
BY Harness & Harris
ATTORNEYS

CHARACTER RECOGNITION SYSTEM

Filed Dec. 8, 1961 5 Sheets-Sheet 2

INVENTOR.
David N. Buell
BY Harness & Harris
ATTORNEYS.

INVENTOR.
David N. Buell
BY
Harness & Harris
ATTORNEYS.

INVENTOR.
David N. Buell
BY
Harness & Harris
ATTORNEYS.

June 28, 1966 D. N. BUELL 3,258,581

CHARACTER RECOGNITION SYSTEM

Filed Dec. 8, 1961 5 Sheets-Sheet 5

INVENTOR.
David N. Buell

BY Harness & Harris

ATTORNEYS

United States Patent Office 3,258,581

Patented June 28, 1966

3,258,581
CHARACTER RECOGNITION SYSTEM

David N. Buell, Royal Oak, Mich., assignor to Chrysler Corporation, Highland Park, Mich., a corporation of Delaware Filed Dec. 8, 1961, Ser. No. 157,995
13 Claims. (Cl. 235—61.11)

This invention relates to a character recognition system and in particular to optical means for recognizing objects which may range from a character imprinted on a sheet of paper to a three-dimensional shape such as an aircraft. The invention is particularly adapted for scanning literature, a series of numbers, or other symbols and for transmitting electrical signals of recognition corresponding to the symbols to another machine, as for example, an electric typewriter, teletype, Linotype, or the like, and is suitable for use in machine translation from one language into another, the reproduction of documents in different styles of type, as well as in the recognition of three-dimensional objects which may include military targets.

An important object of the present invention is to provide a mechanism for moving an image of a character or object to be recognized over the surface of a retina comprising a matrix of closely packed photosensitive elements or receptors of small size in comparison to the image, and for transmitting a signal from the retina to a computer or analyzer which makes fundamental use of the changes in the energy state of the photoreceptors at intervals synchronized with the motion of the image over the retina, so as to transmit a signal of recognition of the character or object.

Character recognition systems based upon an optical input to a retina or matrix of photosensitive receptors commonly require some scheme to compensate for images which are not properly located on the retinal matrix. Such schemes frequently require either a device for bringing the image into predetermined position, or a bank of logical or-gates associated with the matrix to enable recognition of the image in any position.

Another important object of the present invention is to provide an optical recognition system of the foregoing type which is inherently insensitive to the precise location of the image on the retina and which does not depend on the change of state of any particular photosensitive receptor for character recognition, but depends instead upon how many receptors are energized or de-energized during a particular phase of movement of the image.

Another object is to provide a character recognition system wherein the plurality of receptors are spaced over the retinal area, each receptor being responsive to a predetermined change in illumination to transmit an electrical pulse to an event detecting or generating circuit. The latter is responsive to a predetermined pattern of pulses from the receptors to transmit an event signal. The event signals are sorted and accumulated in synchronism with the movement of the image over the retina to effect a transform or electrical output signal which defines the character to be identified and which may be distinguished by standard computer technique to give rise to a signal of recognition.

Another object is to provide an improved retina wherein the receptors are arranged in groups, each group of receptors being identical with the others and each receptor in each group having an associated receptor in each of the other groups, each of the associated receptors having the same orientation in its respective group and being connected in parallelism with an event detecting or generating circuit common to all of the associated receptors. Thus the number of event generating circuits will equal only the number of receptors in each group, rather than the total number of receptors comprising the entire retina.

Other objects of this invention will appear in the following description and appended claims, reference being had to the accompanying drawings forming a part of this specification wherein like reference characters designate corresponding parts in the several views.

Figures 4, 5:
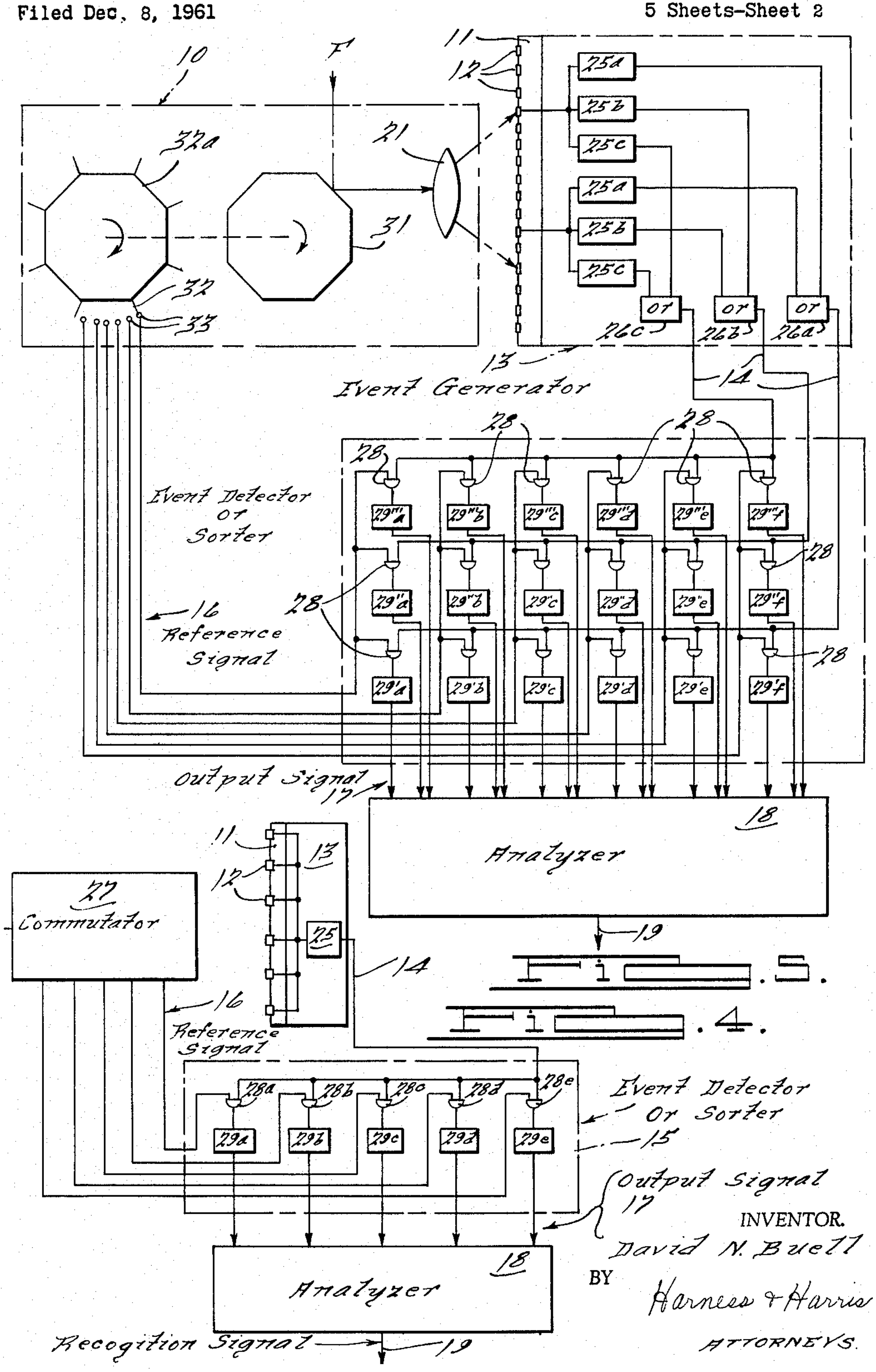
FIGURE 4 is a schematic view illustrating details of the event receptor or sorter circuit.
Figures 6, 7:
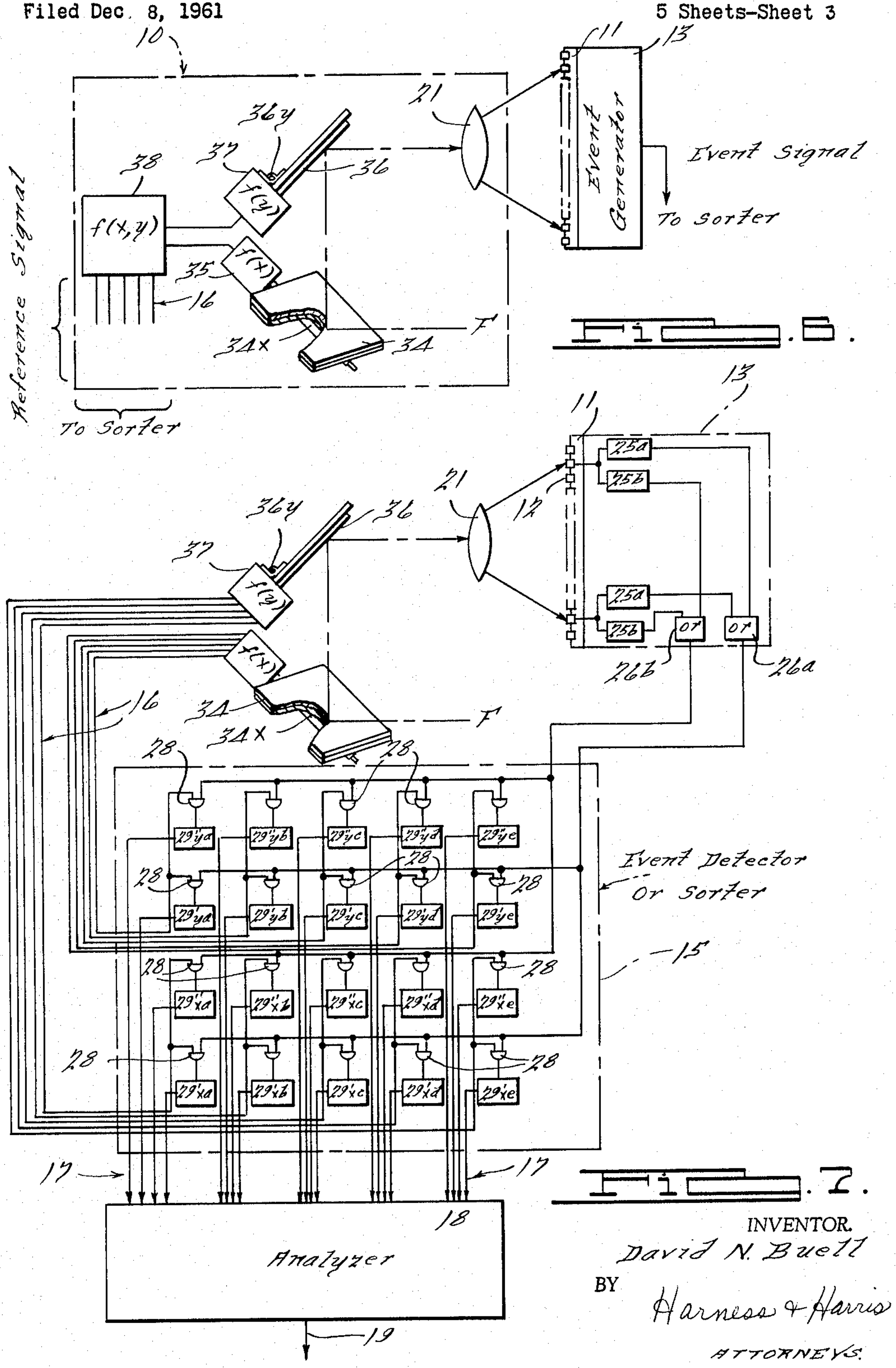

FIGURES 5, 6, and 7 are schematic views of other embodiments of the invention.

Figures 8, 9:
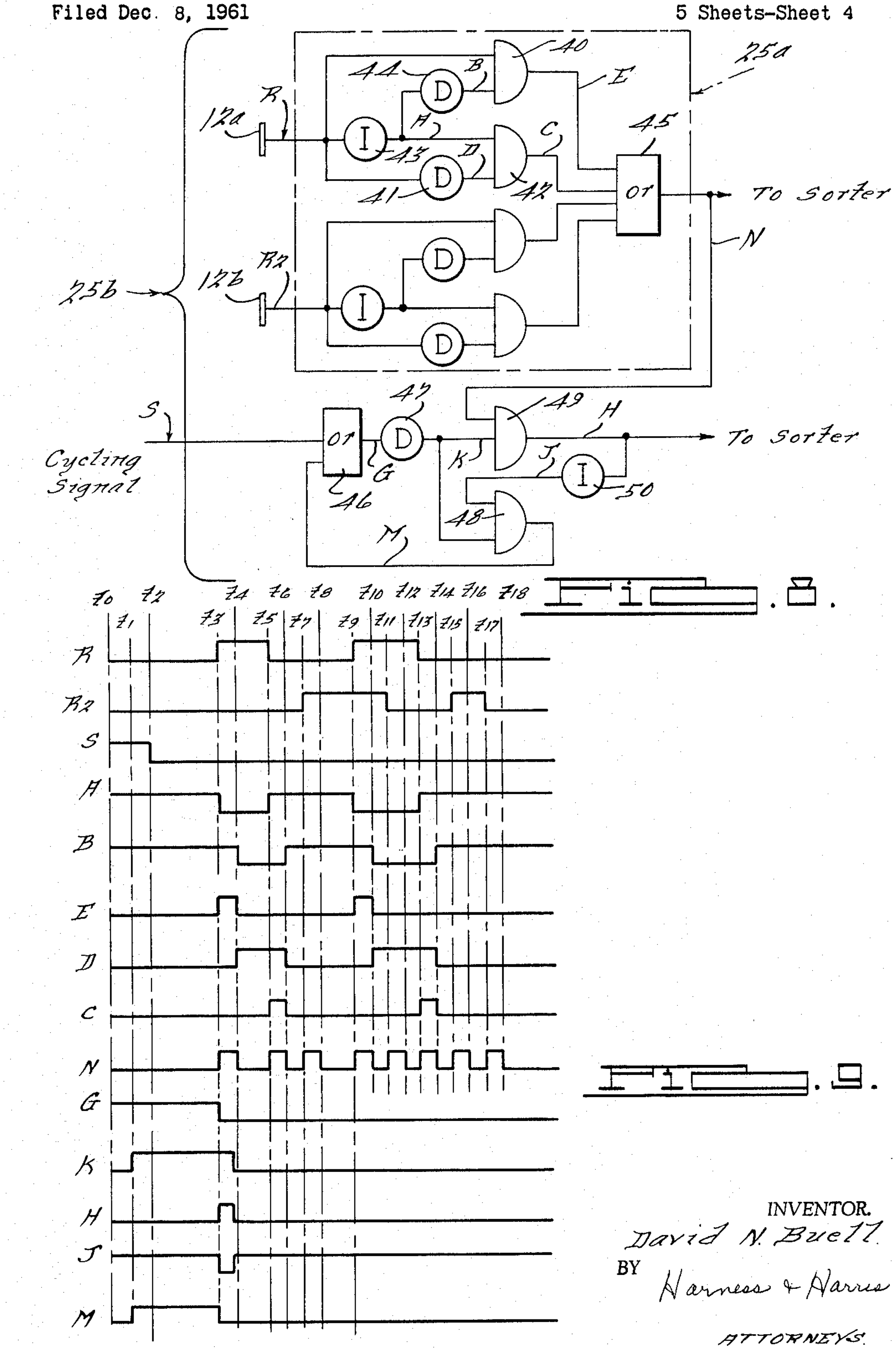

FIGURE 8 is an enlarged view showing details of specific event detecting circuits.

FIGURE 9 illustrates the time relationships between the electrical pulses in the various parts of the circuit of FIGURE 8.

Figure 10:
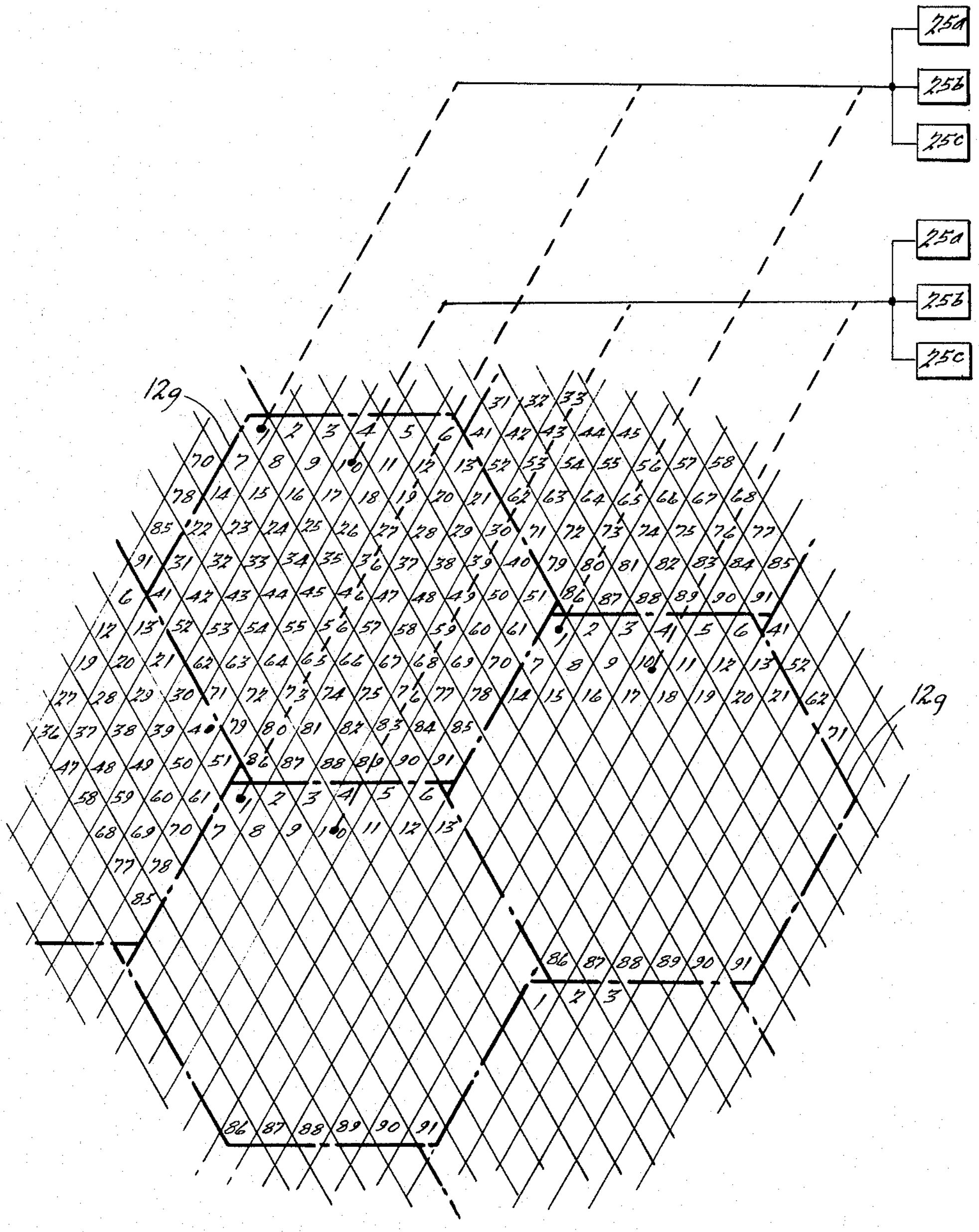

FIGURE 10 is a fragmentary enlarged view illustrating a preferred retina.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figures 1, 2, 3:
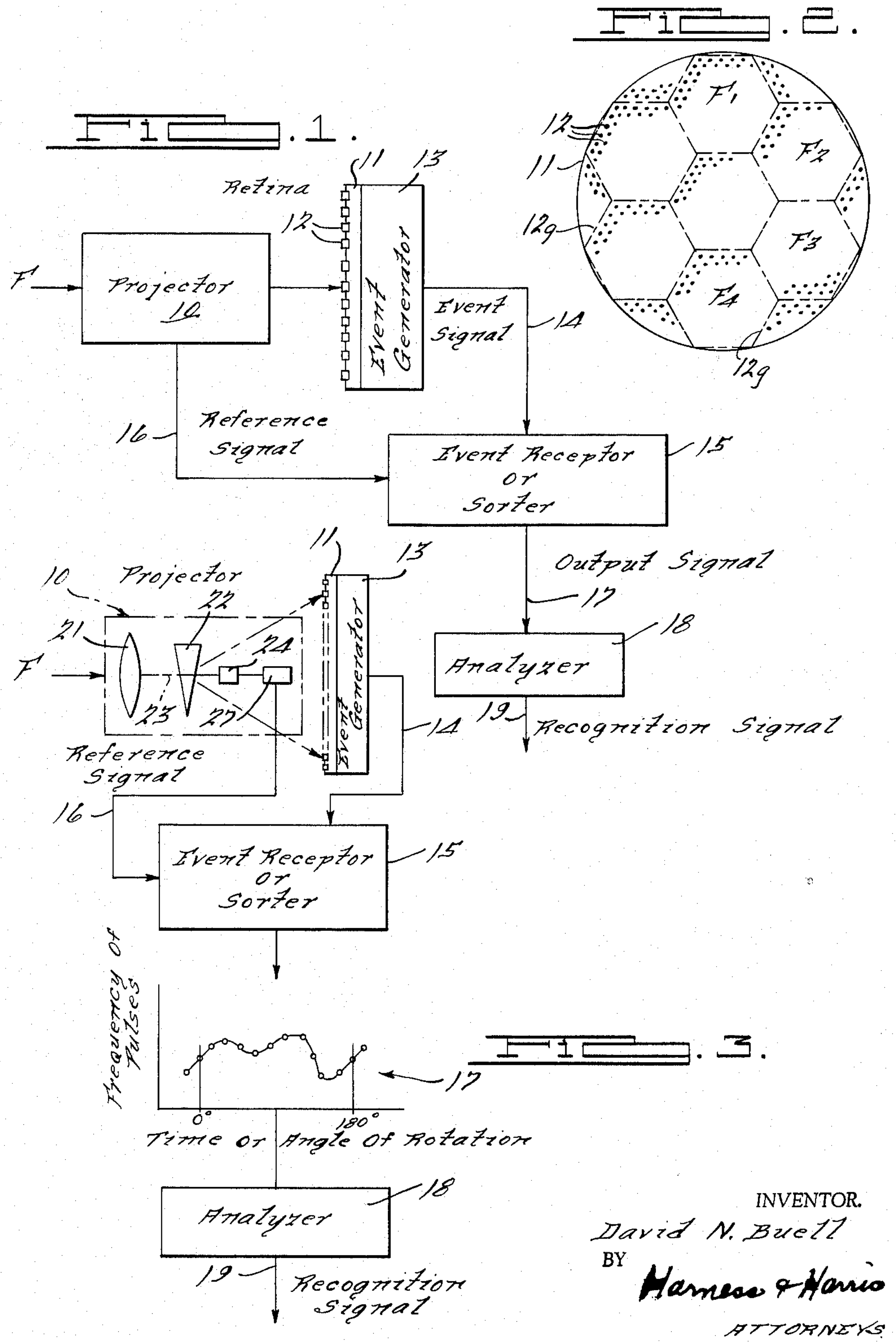
FIGURE 1 is a schematic view of a character recognition system embodying the present invention.
FIGURE 2 is a plan view of the retina illustrated in FIGURE 1.
FIGURE 3 is a schematic view illustrating a particular embodiment of the present invention.

Referring to FIGURE 1, a schematic arrangement of the present invention is illustrated by way of example comprising a projecting mechanism 10 for moving the image of a subject to be recognized over the surface of a target or input signal receptor 11, hereinafter referred to as the retina. Preferably, the mechanism 10 comprises a suitable electrically driven optical system capable of focusing an image of a character F on the retina 11 and for moving the image over the retinal surface.

As illustrated in FIGURES 2 and 10, the retina 11 comprises a matrix of closely packed and symmetrically arranged photosensitive elements or receptors 12 of comparatively small size with respect to the image of F. Each receptor 12 may comprise a minuscle photosensitive member in an operative electrical circuit adapted to transmit an electrical signal or pulse to an event generator 13 and thence to an event detector or sorter and accumulator 15 described below. The signals from the photosensitive elements 12 may be amplified if desired, or where the image of the character F is of sufficient size, each receptor 12 may comprise a comparatively large photomultiplier tube or cell capable of transmitting an electrical signal of sufficient magnitude that subsequent amplification is unnecessary. In any event, the use of amplifying and pulse shaping circuits where desired is well known to the art, so that such circuits are not indicated specifically herein. In certain applications, a random arrangement of the receptors is desirable. In FIGURES 2 and 10, the receptors 12 are arranged in hexagonal groups **12*g***, described more fully below in reference to FIGURE 10.

In general, the event generator 13 will comprise one or more separate or interconnected event detecting circuits associated with each of the receptors 12, each event detecting circuit being capable of emitting an event signal 14 of suitable shape and magnitude in response to a predetermined pattern of pulses transmitted by the receptors 12, as described below.

The event signals 14 are transmitted to the sorter 15 in synchronization with a reference signal 16 to effect a distinguishable transform or electrical output signal 17 which uniquely defines the character F with respect to other characters in a predetermined set thereof. In a particularly versatile circuit arrangement, the various types of event signals 14 from the generator 13 are sorted and accumulated or counted during separate phases of movement of the image of the character F resulting from operation of the mechanism 10. Accordingly, a particular pattern of output signals 17 is transmitted to a conventional analyzer or computer 18 which may comprise comparing or discriminating circuits capable of recognizing the output signal 17 and transmitting a signal 19 of recognition for the character F. In this regard, the sorter and accumulator or receptor 15 will count the total number of event signals 14 of each type originating at the generator 13. By virtue of the reference signal 16, the totals of these event signals 14 will be spaced or grouped in accordance with measurable phases of movement of the image. By suitably selecting the types of events to tbe detected and accumulated, a distinguishable set of signals or transform will be transmitted from the sorter 15 as a totalized output signal 17 which can be recognized by standard computer technique.

It can be shown that simple nutation of the image of the character F around the central axis of the retina 11 will result in transmission of as much information to the system as will any other simple type of motion. Accordingly in FIGURE 3, the mechanism 10 comprises a lens system 21 and an optical wedge 22 rotatable by means of motor 24 about an axis 23 coaxial with lens 21 and retina 11. As the wedge 22 rotates, the image of character F will be nutated about the axis 23 and will appear for example at locations F1, F2, F3, etc., at times T1, T2, and T3, as illustrated in FIGURE 2. A similar result can be obtained by replacing wedge 22 with a rotatable mirror arranged obliquely to axis 23 so as to rotate the image over the retinal area. The event generator 13 may comprise a simple amplifier and pulse shaping circuit 25, FIGURE 4, connected with each receptor 12 for transmitting an event signal 14 to the sorter 15 whenever one of the receptors 12 is excited by more than a predetermined change in illumination upon passing of the image of the character F. The synchronizing signal 16 may originate from a commutator device 27 operably connected with the motor 24 which rotates the wedge 22.

As illustrated in FIGURE 4, the event signals 14 from circuit 25 are transmitted to a set of and-gates 28, one being provided for one of each of the units or intervals into which the movement of the image of character F is divided. In this regard, the summation of the number of times that the receptors 12 change state will be taken at intervals determined in accordance with the complexity of the different types of characters that are to be distinguished and recognized by the system. It will be apparent that where several characters similar in appearance are to be distinguished from each other, more data will be required by the analyzing circuit 18 than would be required merely for distinguishing a few totally unlike characters from each other.

In FIGURE 4 and-gates **28*a* through 28*e* are illustrated by way of example associated with five distinct timing signals from the commutator 27. Thus during nutation of the image of character F through approximately 36° around the axis of the retina 11, a timing or reference signal 16 is transmitted to and-gate 28*a*. During each succeeding 36° of rotation, the timing signal 16 will be transmitted to the and-gates 28*b*, 28*c*, etc. in turn until the image has been nutated through 180°. Where the photoreceptors 12 are sufficiently small and closely packed and the "events" to be counted are simple "on" or "off" states of the receptors 12 corresponding to changes in illumination thereat from dark to light or from light to dark, additional movement beyond 180° will not usually provide useful information, although the other half of the retina 11 may be employed for recognition of a succeeding character. Where the events occurring at the receptor 12 and distinguishable by the generator 13** are sufficiently complex, as would be required in distinguishing a large number of similar characters from each other, the remaining half of the retina, or even more than 360° of nutation would be employed.

Each of the several and-gates **28*a*–28*e* in FIGURE 4 is connected with a counter 29*a*–29*e* respectively and is effective to transmit an event signal 14 to its connected counter when it is energized simultaneously by an event signal from circuit 25 and a timing signal from commutator 27. During the interval that a reference signal 16 is being transmitted to gate 28*a*, the associated counter 29*a* will count all the changes of state in the receptors 12 capable of being detected by the circuit 25. During the subsequent intervals that the and-gates 28*b*, 28*c*, etc. receive the reference signal 16, the associated counters 29*b*, 29*c*, etc. will count the similar changes of state. It is accordingly apparent that the data accumulated by the sorter 15 in FIGURES 3 and 4 depends only upon the total number of receptors 12** being activated during any particular reference interval, and is entirely independent of the precise location of the image on the retina.

The data from the sorter 15 is transmitted as an output signal 17, which in the situation illustrated in FIGURE 3 may comprise points on a simple curve of pulse frequency plotted on the ordinant against time on the abscissa. This output signal curve 17 of FIGURE 3 is known as the transform of the character F. A separate transform 17 will be associated with each of the different characters to be recognized. The output signal or transform 17 is compared with a similar transform in the analyzer or computer 18 (or is otherwise identified by suitable discriminating circuits) which transmits the signal of recognition 19 to an appropriate machine or machines to actuate the latter.

Instead of a simple signal represented by the energizing or de-energizing of a photosensitive element 12 upon passage of an image thereover, the signal detected by the event generator 13 may be as sophisticated as required in order to render the system capable of distinguishing between large numbers of characters which may differ from each other only slightly. Thus instead of responding merely to a predetermined quantity of light energy falling on the receptor 12 during passage of the image, which may be considered one type of event, the event generator 13 may be designed to respond to and recognize as a single event any one or more of an almost limitless number of permutations and combinations of the changes in state of the receptors 12 in various groupings and time relationships. Each event will give rise to a single event signal 14, as described below in conjunction with FIGURES 8 and 9. A few examples of such events include: (A) The change in state at each receptor 12 when the image moves off the edge of the retina. Alternately, the receptors immediately in advance of the moving image may be inactivated after the image has been rotated through 180°, thereby to produce an artificial retinal edge. (B) The change in state of a particular receptor two, four, six or more times. (C) The first and only the first change in state of each receptor during each measurement interval. (D) The change in state of only the first member of a group when the receptors are arranged in groups of two or more. (E) A predetermined change in state of all or a majority of the members of a group when the receptors are arranged in groups of two or more.

In FIGURE 5, each photo receptor 12 is connected in parallelism with three different types of event detectors in the circuit 13. Each of the event detectors **25*a*, 25*b*, and 25*c* is connected through an associated or-gate 26*a*, 26*b*, or 26*c* respectively, with the sorter 15. In the sorter 15 a separate bank of counters 29′, 29″, and 29‴ is connected with one of each of the or-gates 26*a*, 26*b*, and 26*c* respectively by means of an associated row of and-gates 28, one and-gate 28 in the set being associated with one of each of the counters in the circuit 15 of FIGURE 5. The total number of occurrences of the events detectable by the circuits 25*a* will be counted by the bank of counters $29'$ in separate intervals of time or other suitable measureable intervals synchronized with the movement of the image over the retina 11. Similarly the events detectable by the circuits 25***b* and 25*c* will be counted by the banks of counters $29''$ and $29'''$ respectively. The and-gates 28 and set of or-gates 26 may comprise conventional circuits known as logic elements or blocks and are not described in further detail, each and-gate being effective to transmit a "yes" signal in one direction only when it receives a "yes" signal simultaneously from each of its signal sources, and each or-gate being effective to transmit a "yes" signal in one direction only when it receives a "yes" signal from any one of its signal sources.

In FIGURE 5, instead of the rotating wedge 22, an octagonal mirror 31 is rotated by a suitable motor so that the image of character F will sweep transversely across the retina 11, as for example along the *y*-axis of FIGURE 2, as each of the separate eight mirror elements rotates into optical alignment with the character F and lens system 21. Rotatable with the octagonal mirror 31 are a set of eight electrical contactors 32 in an operative electrical circuit 32*a* and spaced 45° apart, each contactor 32 being adapted to sweep across a set of reference signal commutator contacts 33 so as to divide the movement of the image effected by each mirror element into a predetermined number of time intervals synchronized with that movement.

In FIGURE 5, six commutator contacts 33 or time intervals are employed by way of example with the movement of each of the elements of mirror 31 in the optical path of image F, each contact 33 being also connected in parallel with the column of and-gates 28 associated with one of each of the columns of counters 29. When the commutator 32 is transmitting a reference signal through the first contact 33, that signal will be transmitted to each of the and-gates 28 associated with the counters $29'a$, $29''a$, and $29'''a$. If at the same time an event detectable by one of the circuits 25*a*, 25*b*, or 25*c* also takes place, that event will be counted or totalized by the appropriate counter $29'a$, $29''a$, or $29'''a$. Similarly the detectable events occurring in the succeeding time intervals determined by the successive contacts 33 will be counted by the appropriate columns of counters $29'b$, $29''b$, $29'''b$; the column of counters $29'c$, $29''c$, $29'''c$, etc., in turn. The output signal 17 from the sorter 15 is transmitted to the analyzer circuit 18 and employed as described above.

Where it is desirable to effect a two dimensional movement of the image over the retinal surface, means for moving the image in the directions of both the *x*-axis and *y*-axis are employed. FIGURE 6 illustrates a mechanism 10 for moving the image over the surface of the retina 11 wherein a first mirror 34 arranged in the optical path of character F and lense system 21 is oscillated about an axis 34*x* by a suitable motor and signal generator 35 to sweep the image of character F across the retina 11 in a direction substantially parallel to the *x*-axis of FIGURE 2. A second mirror 36 oscillated about axis 36*y* by motor and signal generator 37 is arranged in the image path to sweep the image substantially parallel to the retina's *y*-axis. Synchronizing signals are transmitted from the motors 35 and 37 to a commutator or reference signal generator 38 which combines the separate signals and directs the combined reference signal as a function of the movements of the mirrors 34 and 36 to the sorter 15.

In this instance the motor 35 may be considered to operate as a function of *x*, whereas the motor 37 operates as a function of *y*. The combined reference signal 16 will be a desirable function of *x* and *y*, as for example $y/x$, or the tangent of the angle made by the velocity vector of the image motion of the character F with reference to the *x* and *y* coordinates. By suitably determining the angular relationships of the axes 34*x* and 36*y* and the phase relationships of the oscillating mirrors 34 and 36, the image of character F can be moved over the retinal area in various two-dimentional paths, including a circular path as in FIGURE 3. In other respects, the event generator 13 and sorter 15 operate as described in regard to FIGURES 1–6. Circuitry for transmitting signals from the motors 35 and 37 and for combinating these signals in the signal generator 38 is well known to the art and is accordingly not described in detail.

FIGURE 7 illustrates a modification of the device of FIGURE 6, wherein separate signals from the motors 35 and 37 are transmitted directly to the sorter 15 without first being combined. In this instance, the event generator 13 comprises two types of event detectors 25*a* and 25*b* associated with each of the receptors 12 and effective to transmit event signals through the associated or-gates 26*a* and 26*b* to the sorter 15. In FIGURE 7, dual sets of counters 29 are provided, one set comprising two rows of counters designated $29'xa$ and $29''xa$ associated with the $f(x)$ reference signal from motor 35, the other set comprising two rows of counters designated $29'ya$ and $29''ya$ associated with the $f(y)$ signal from motor 37. The five counters in each of the four sets and associated with the five reference signals from the motors 35 and 37 are distinguished by the letters *a* through *e*. Each set of counters operates the same as described in conjunction with FIGURE 4 so as to transmit the associated $f(x)$ or $f(y)$ transform 17 of the character F to the analyzer circuit 18, which in turn transmits the signal 19 or recognition of the character F to a suitable auxiliary machine.

Details of typical event detector circuits 25*a* and 25*b* associated with photosensitive receptors 12*a* and 12*b* are illustrated by way of example in FIGURE 8 wherein detector 25*a* is designed to transmit an event pulse for each change in state resulting from a predetermined change in illumination of either of the associated receptors 12*a* or 12*b*. Each detector 25*b* is designed to transmit an event pulse only the first time one of the receptors 12*a* or 12*b* changes state in a given cycle.

Referring in more detail to detector 25*a*, a predetermined change in illumination at the receptor 12*a* will send an electrical pulse or signal along conductor R to the and-gate 40, a delayed signal through the delay circuit 41 to the and-gate 42 via conductor D, and an inverted signal through the signal inverter 43 to both the and-gate 42 and delay circuit 44 via conductor A. The delay circuit 44 transmits a delayed signal to the and-gate 40 via conductor B.

The delay and inverter circuits may be standard and are not otherwise described in detail. Each of the delay circuits 41 and 44 operates to momentarily delay any signal received thereby and then to transmit the delayed signal to the associated and-gate 42 or 40. The inverter circuit 43 on the other hand operates to completely reverse any signal received thereby. Accordingly if a "yes" signal is transmitted by line R1, indicating for example illumination at receptor 12*a*, a "no" signal will be transmitted by the inverter circuit 43 along conductor A. The "no" signal transmitted along line A in this example will be equivalent to the signal transmitted along line R1 when the photosensitive receptor 12*a* is not illuminated. Obviously in the circuits described herein, the opposite relationship could be employed between illumination and the "yes" pulses from receptors 12 where desired.

Referring also to FIGURE 9, lines R, R2, S, A through E and G through K, M and N represent the signals transmitted by the correspondingly lettered conductors in FIGURE 8 during the various time intervals *t*0 through *t*18. As indicated by line R in FIGURE 9, during the intervals *t*0 to *t*3, *t*5 to *t*9, and *t*13 to *t*18, receptor 12*a* is not energized or illuminated and is transmitting a "no" signal. During the time intervals *t*3 to *t*5, and *t*9 to *t*13, the photo receptor 12*a* is energized to transmit a "yes" signal. The signal at A in FIGURE 8 is of course the opposite of the signal at R. The signal at B in FIGURE 8 transmitted by delay circuit 44 is the same as the signal at A, but delayed in time by the intervals *t*4–*t*3, *t*6–*t*5, *t*10–*t*9, and *t*14–*t*13.

The signal pulses in the time intervals $t4-t3$, etc., in line N typically will be of equal magnitude and approximately a micro-second in duration. A "yes" signal at E is transmitted by and-gate 40 during the time intervals $t4-t3$ and $t10-t9$ when a "yes" signal occurs simultaneously at R and B. The signal at D is the same as the signal at R, but delayed by the intervals $t6-t5$ and $t14-t13$. A "yes" signal at C is transmitted by and-gate 42 when a "yes" signal is indicated simultaneously at A and D, i.e., during time intervals $t6-t5$ and $t14-t13$. Lines C and E are connected by or-gate 45 to line N, so that a "yes" signal will occur in the latter line whenever a "yes" signal occurs at either C or E, i.e., at both time intervals $t4-t3$ and $t6-t5$ when the illumination at photo receptor 12*a* changes from off to on and subsequently from on to off, and similarly at both time intervals $t10-t9$ and $t14-t13$.

The circuit connecting receptor 12*b* with or-gate 45 is a duplication of the above described circuit associated with receptor 12*a*, so that a "yes" signal will also be transmitted through or-gate 45 to line N each time the signal in line R2 from receptor 12*b* changes from off to on or from on to off, as illustrated at times $t8-t7$, $t12-t11$, $t16-t15$, and $t18-t17$ It is thus apparent that the event indicator 25*a* will transmit an event signal via N to the sorter 15 each time either one of the receptors 12*a* or 12*b* experiences a predetermined change in illumination.

The event detecting circuit 25*b* includes a flip-flop circuit connected at N with the circuit 25*a* to receive a feedback pulse therefrom. A recycling signal S is generated by an external source, which may be synchronized with the mechanism 10 or with the start of the recognition of a new character F, as for example after each 180° of rotation of wedge 22, FIGURE 3. The recycling pulse S is transmitted through or-gate 46 and then to delay circuit 47 via conductor G. The delayed recycling pulse at K is conducted to and-gates 48 and 49. The latter receives the feed-back pulse from N to transmit an event signal via H to the sorter 15 when "yes" signals are conducted simultaneously via K and N.

The event signal at H is inverted by circuit 50, so that when an event signal does not exist at H, a "yes" signal is applied continuously to and-gate 48 via conductor J. Accordingly, the delay recycling signal at K is effective to flip the flip-flop circuit to "on" by virtue of line M which transmits the simultaneous "yes" signals at J and K back through or-gate 46, so as to re-energize line K with a "yes" signal and maintain a continuous "yes" signal at M. It is only essential in this regard that the delay occasioned by circuit 47 be less than the duration of the recycling signal S, so that the "yes" signal at M will be returned to the or-gate 46 before the termination of the recycling signal S.

When the first "yes" pulse or event signal after the recycling signal S, i.e., at $t3$, is transmitted by line N to and-gate 49, an event signal is conducted via H to sorter 15. This signal is also inverted by inverter circuit 50 to transmit a "no" signal through J to and-gate 48, thereby to flop the flip-flop circuit to "off" by interrupting the continuous "yes" signal at M and subsequently at K after the delay occasioned by delay circuit 47. The latter delay must of course be slightly less than the duration of the event signal at N in order to prevent the flip-flop circuit from flipping back to "on." Thereafter, subsequent event signals at N will have no effect at H in the detector circuit 25*b* until the flip-flop circuit is flipped to "on" by the next recycling pulse.

Referring to FIGURE 10, a fragmentary enlargment of a preferred retina 11 is illustrated wherein the photosensitive receptors are arranged in a number of hexagonal group 12*g*, the individual receptors in each group being identified by numerals 1 through 91 by way of example to show the relationship of each receptor to an associated receptor in each of the other groups. Each receptor is arranged in the same relative position within its group 12*g* as are the associated receptors in their respective groups 12*g*, all the associated receptors being connected in parallelism to a common event detecting circuit assembly. The total number of such assemblies will accordingly equal the number of receptors in one group, rather than the total number of receptors in the entire retina 11. For example, all of the receptors numbered 1 are connected in parallelism with one assembly comprising in the present instance three event detectors 25*a*, 25*b*, and 25*c*. Similarly each of the receptors numbered *i* (where *i* represents any integer in the series 1 through 91) is connected to a separate event detecting assembly, each such assembly being identical with the others. If the size of each hexagonal group 12*g* is determined so as to contain the entire image of character F focused thereon by the mechanism 10, the image as it moves from one group 12*g* to another will never cause a change in illumination at any one time at more than one receptor having the same identifying numeral.

I claim:

1. In an optical recognition system, a retina comprising a plurality of photosensitive receptors arranged over a retinal area, each being adapted to emit electrical pulses in response to changes in the illumination thereof, an event generating means associated with each receptor and responsive to predetermined pulse patterns therefrom for transmitting electrical event signals, means for moving an image of a subject to be recognized in a constantly changing direction over the surface of said retina to effect said pulses, means associated with the last named means for transmitting electrical reference pulses, and means responsive to said event signals and reference pulses for sorting and accumulating said event signals in synchronization with the movement of said image.

2. In the combination according to claim 1, said event generating means comprising a plurality of circuits, each circuit being responsive only to a predetermined pulse pattern from the associated receptor for transmitting an electrical event signal.

3. In the combination according to claim 2, said means for sorting and accumulating said event signals comprising a plurality of counters, each being responsive to a specific event signal occurring during a specific movement interval of said image.

4. In an optical recognition system, a retina comprising a plurality of photosensitive receptor means arranged over a retinal area, each being adapted to emit electrical event pulses in response to predetermined changes in the illumination thereof, means for directing an image of a subject to be recognized onto said retina, the last named means including an optical member rotatable about an axis and effective to deflect said image obliquely to said axis, means for rotating said member about said axis to nutate said image over said retina, means for transmitting electrical reference pulses in synchronism with rotation of said member, and means responsive to said reference pulses for sorting and accumulating said event pulses in predetermined relationship with respect to said reference pulses.

5. In a retina for a character recognition system, a plurality of groups of photosensitive receptors, a number of circuits corresponding to the number of photosensitive receptors in each group, each receptor in each group being associated with a corresponding receptor in each of the other of said groups and the associated receptors being connected in parallelism with a corresponding one of said circuits, each receptor being responsive to a predetermined change in illumination thereof for transmitting an electrical pulse to the circuit connected thereto.

6. In the combination according to claim 5, each of the associated receptors connected with a common event generating circuit having the same spatial orientation in its respective group as in the others of said associated receptors.

7. In the combination according to claim 6, means for moving an image of a subject to be recognized over the area of said retina, the area covered by each group of receptors being sufficiently large to contain said image wholly therein.

8. In an optical recognition system, a retina comprising a plurality of photosensitive receptor means arranged over a retinal area, each being adapted to emit electrical pulses in response to predetermined changes in the illumination thereof, a plurality of light deflecting members cooperable with each other for directing an image of a subject to be recognized onto said retina, each member being separately operable to impart a specific movement to said image across the surface of said retina, a separate operating means associated with each member for operating the same and for transmitting electrical reference pulses synchronized with the image movement imparted by said member, and a separate signal receiving means associated with each operator means and being responsive to the reference pulses therefrom and to the first named electrical pulses for totaling the latter within intervals determined by said reference pulses.

9. In the combination according to claim 8, each signal receiving means comprising a set of counters operatively connected with said receptor means to receive predetermined pulses therefrom, each counter in each set being responsive to said signal pulses to be activated thereby to receive said predetermined pulses only during a predetermined interval determined by said reference pulses.

10. In an optical recognition system, a retina comprising a plurality of photosensitive receptor means arranged over a retinal area, each being adapted to emit electrical pulses in response to predetermined changes in the illumination thereof, a plurality of light deflecting members cooperable with each other for directing an image of a subject to be recognized onto said retina, each member being separately operable to impart a specific movement to said image across the surface of said retina, a separate operating means associated with each member for operating the same and for transmitting electrical reference pulses synchronized with the image movement imparted by said member, means cooperable with all of said operating means and effective to combine the separate reference pulses therefrom into a single set of electrical reference signals, and means for coordinating said first named electrical pulses with respect to said reference signals.

11. In the combination according to claim 10, the last named means comprising a set of counters operatively connected with said receptor means to receive predetermined pulses therefrom, each counter being responsive to said reference signals to be actuated thereby to receive said predetermined pulses only during a predetermined interval determined by said reference signals.

12. In a recognition system, a retina comprising a plurality of receptor means including a plurality of sensing elements closely spaced over a retinal area adapted to contain the entire area of a circle scribing a subject to be recognized, means for moving said subject in a continuously changing direction over said area in association with said elements, said receptor means being adapted to transmit event signals predetermined by said movement with respect to said elements, means synchronized with said movement for emitting reference signals at intervals predetermined by said movement, and means for counting the number of said event signals associated with each reference signal.

13. In a recognition system, a retina comprising a plurality of receptor means defining a retinal area and responsive to a subject to be recognized to transmit event signals in accordance with movement of said subject over said area, said area being adequate to encompass said subject in its entirety, means for effecting said movement over said area in a constantly changing direction, means synchronized with said movement for emitting reference signals at intervals predetermined by said movement, and means for counting said event signals associated with each of said reference signals.

References Cited by the Examiner

UNITED STATES PATENTS

| | | | |
|---|---|---|---|
| 2,932,006 | 4/1960 | Glauberman | 340—146.3 |
| 2,978,675 | 4/1961 | Highleyman | 235—61.115 |
| 3,050,711 | 8/1962 | Harmon | 235—61.115 |

ROBERT C. BAILEY, *Primary Examiner.*

MALCOLM A. MORRISON, *Examiner.*

P. J. HIRSCHKOP, G. D. SHAW, *Assistant Examiners.*